FIG. I

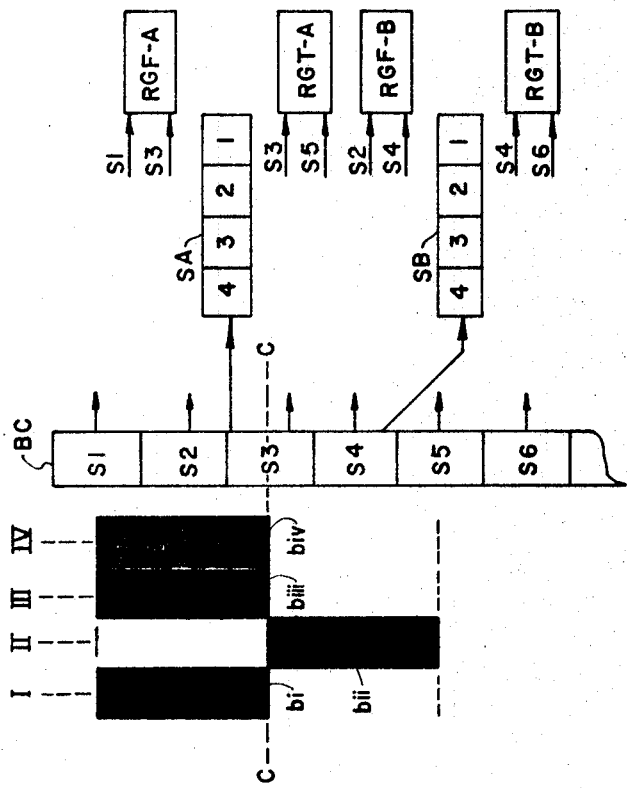

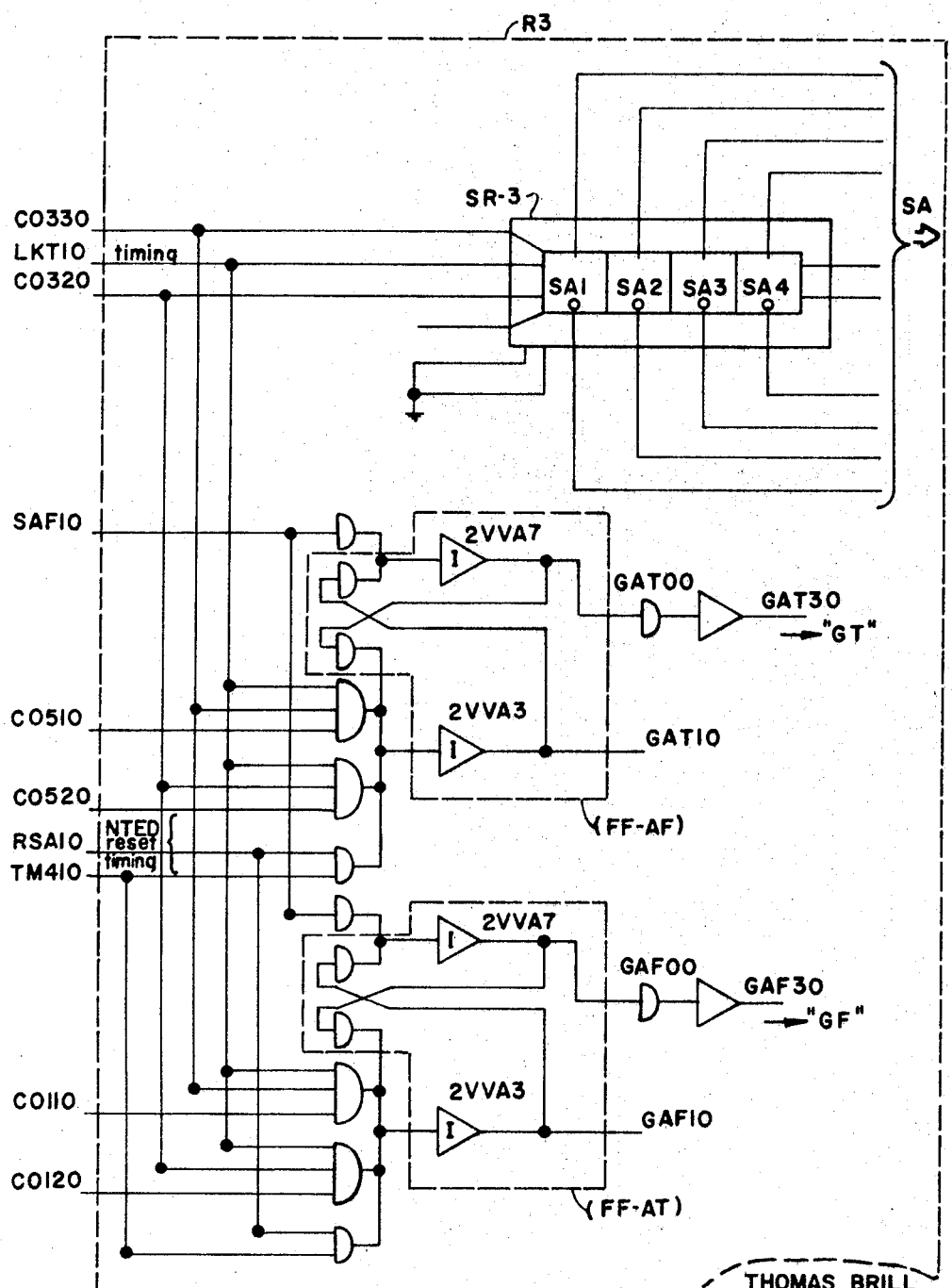
FIG. 5-A

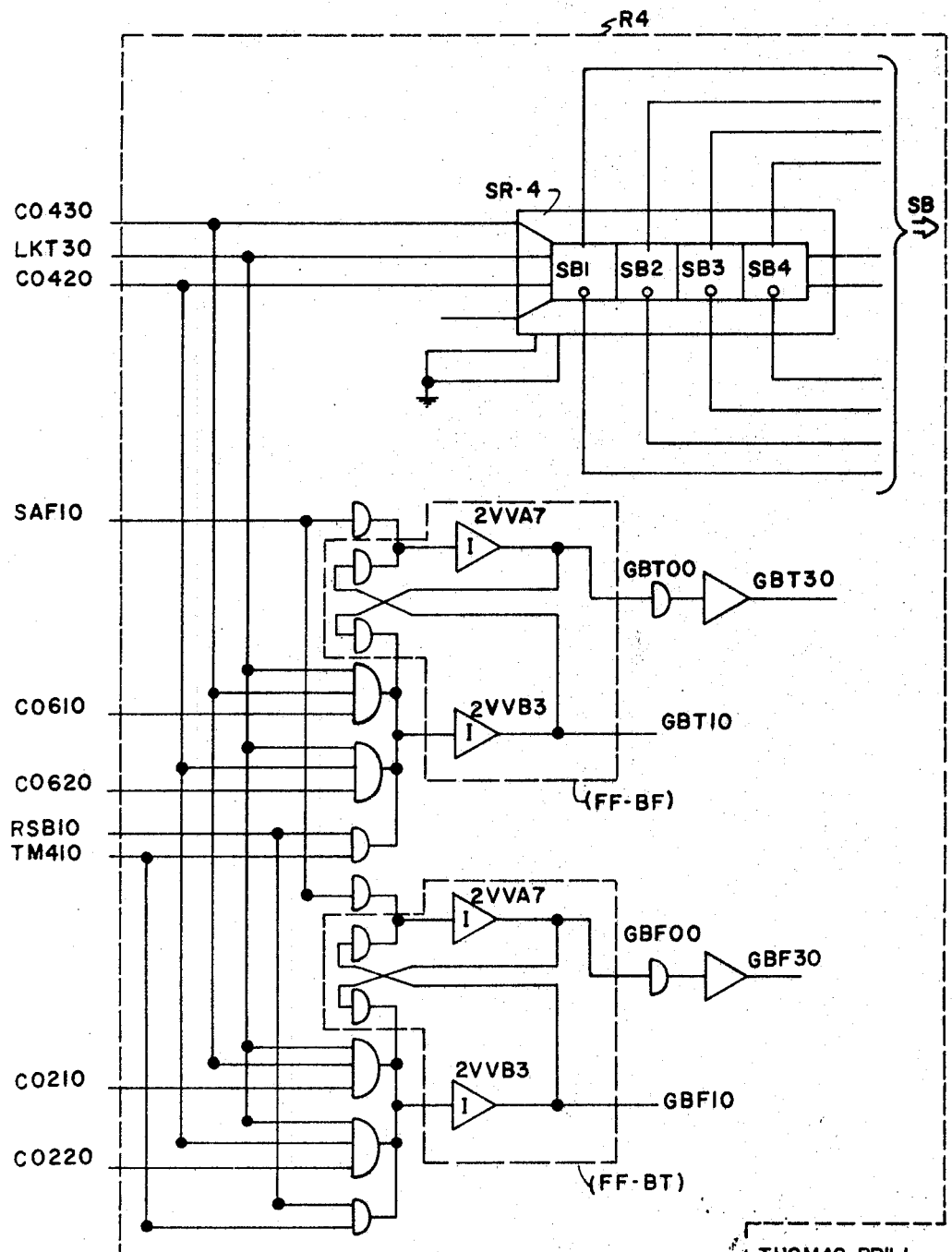
FIG. 5-B

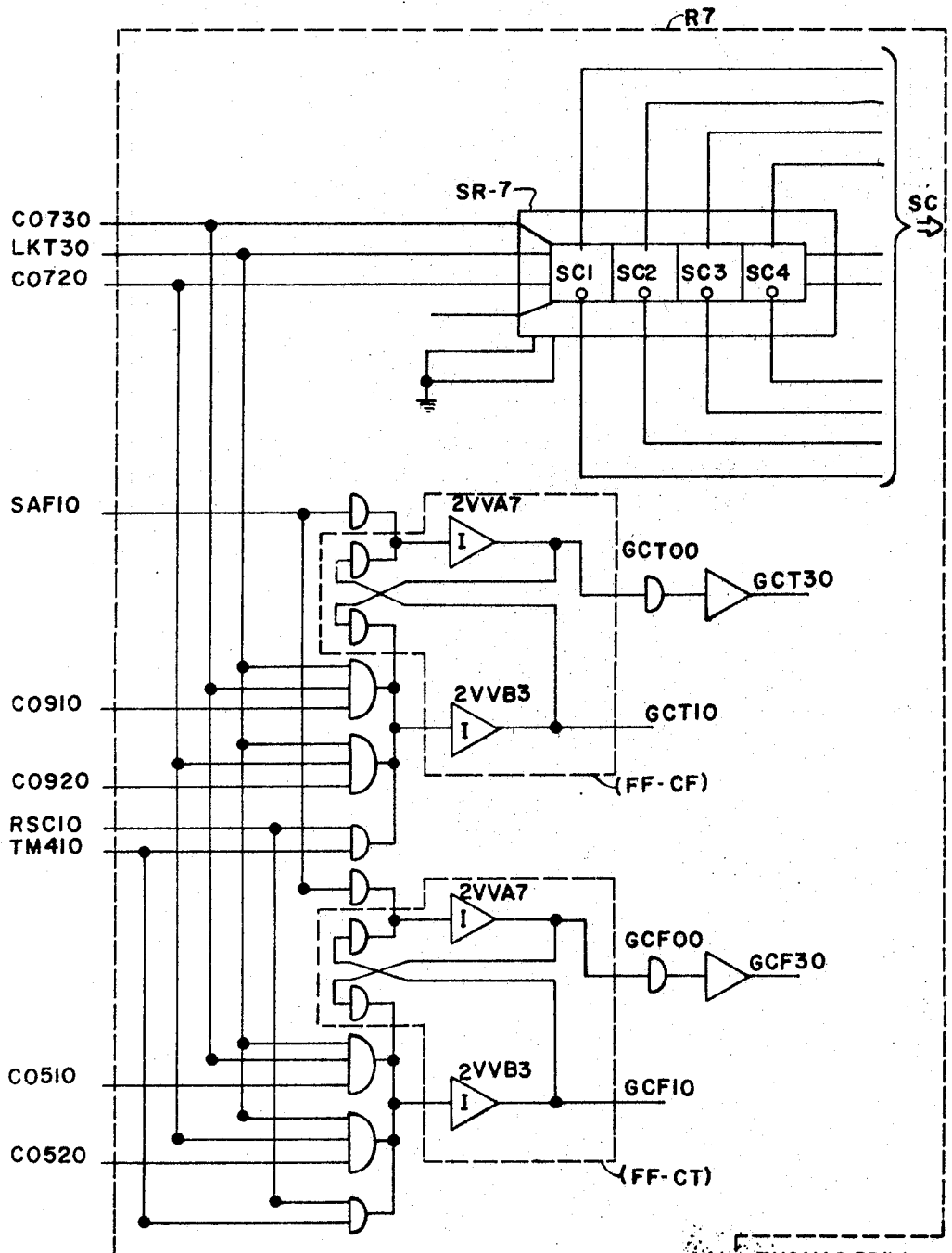
FIG. 5-C

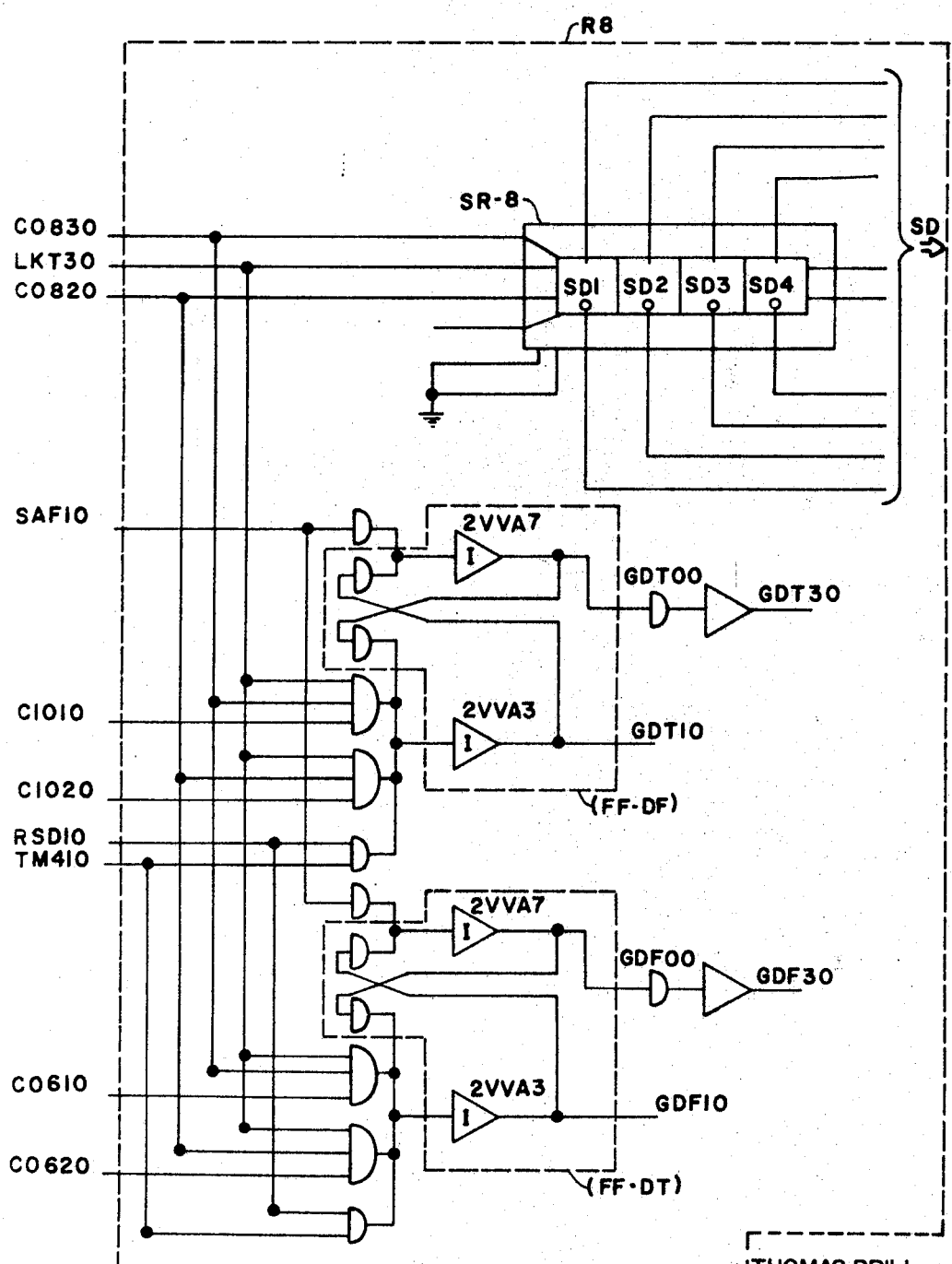
FIG. 5-D

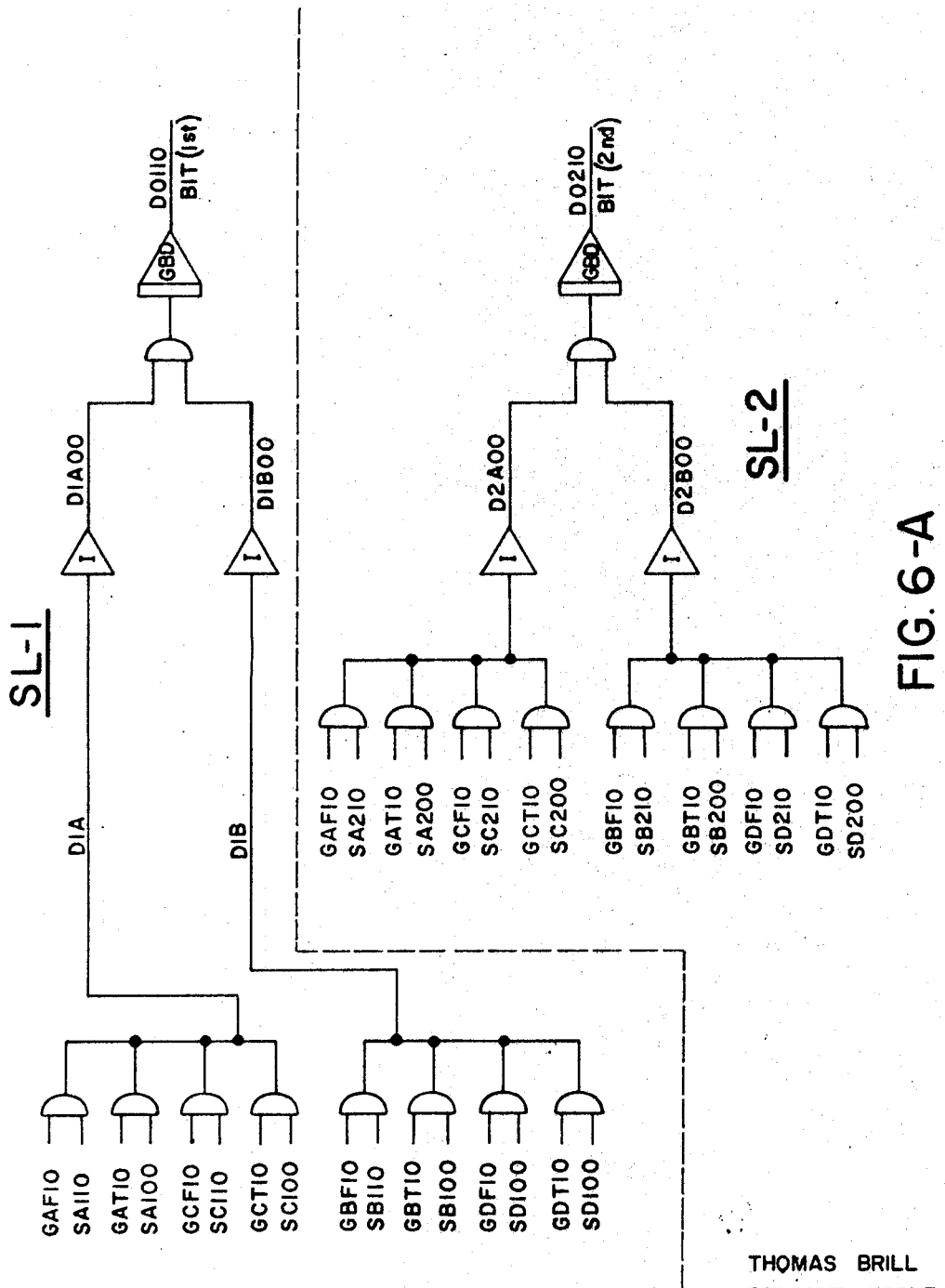

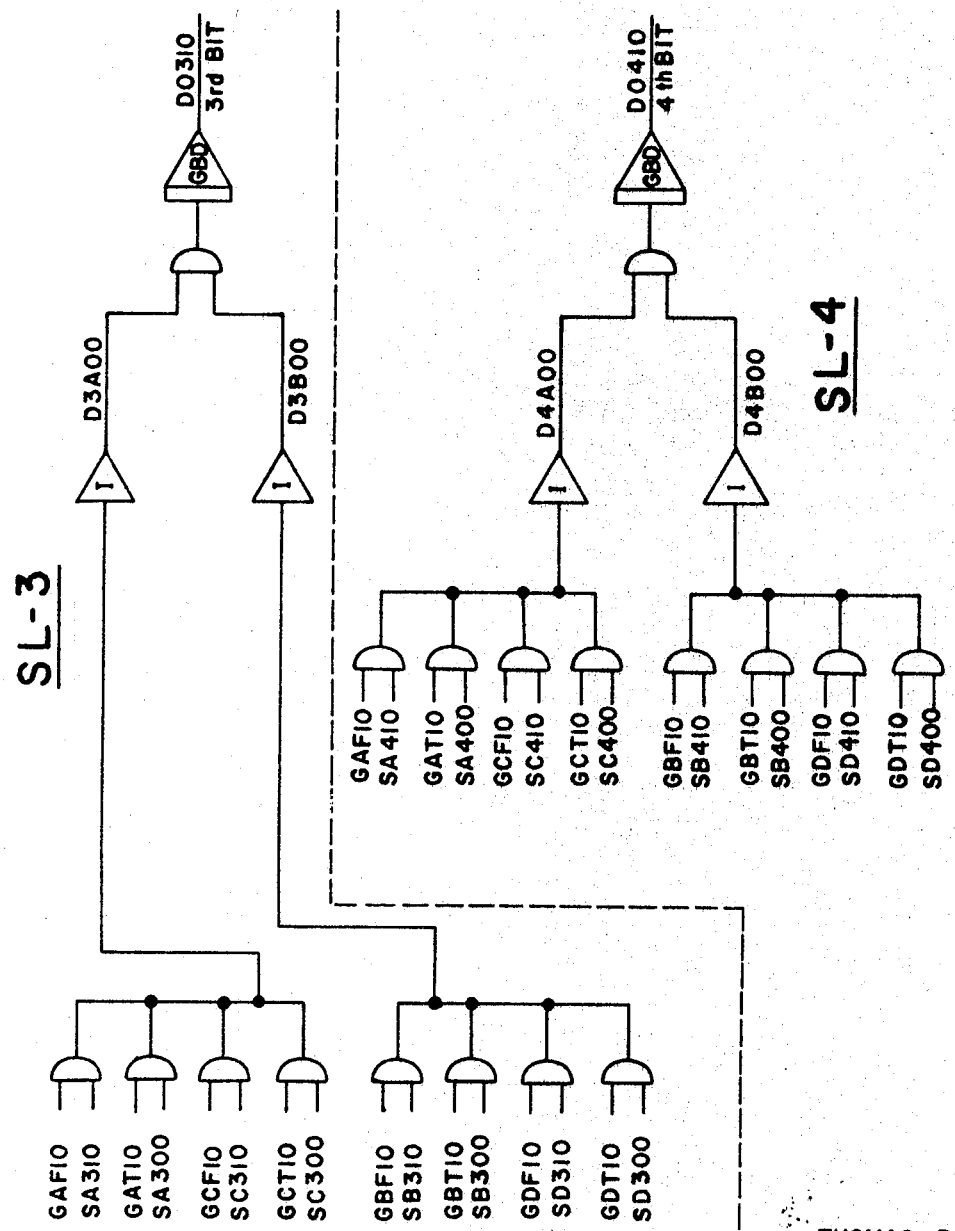

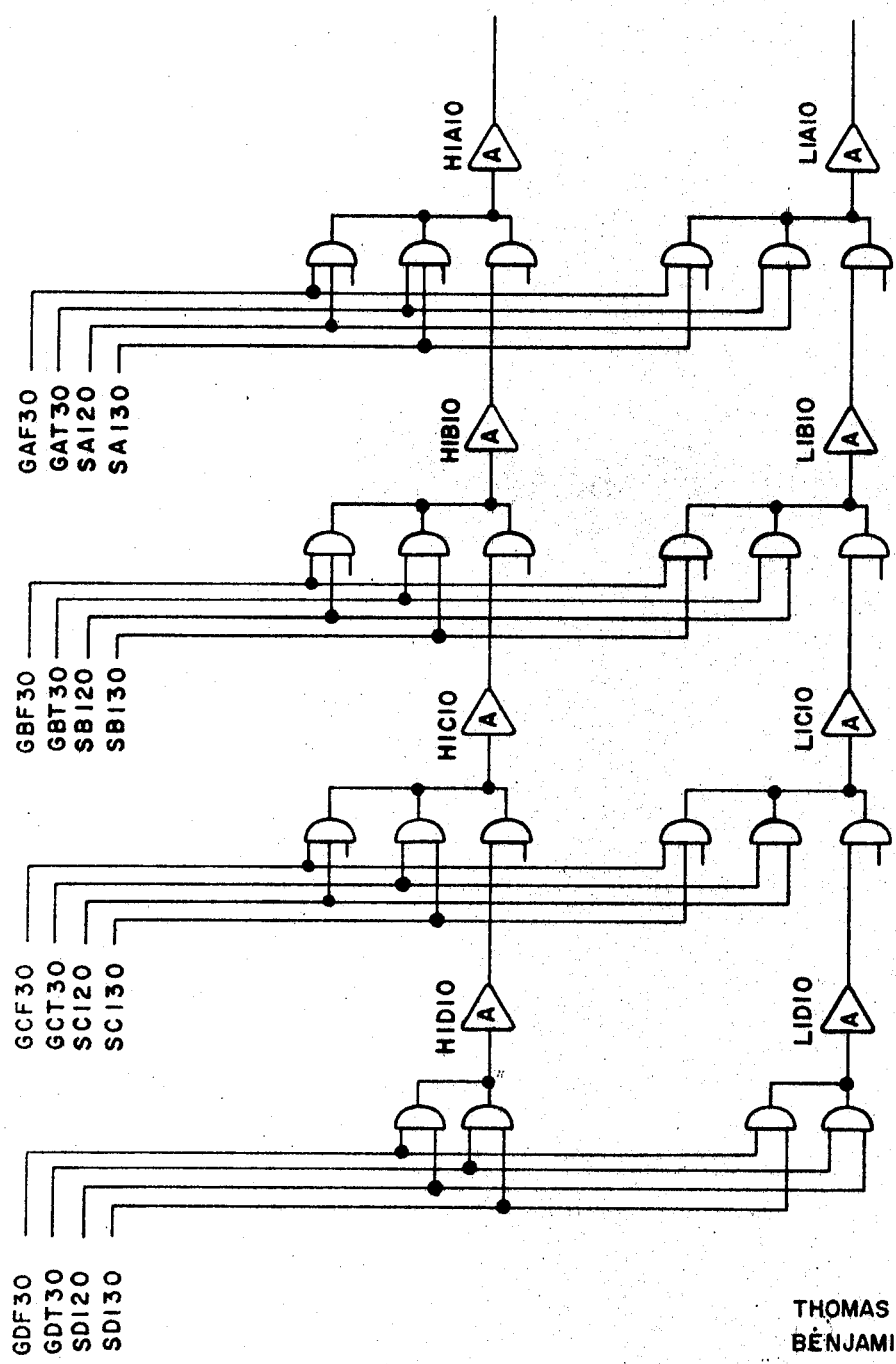
FIG. 10-A (CONFLICTING 1st BIT)

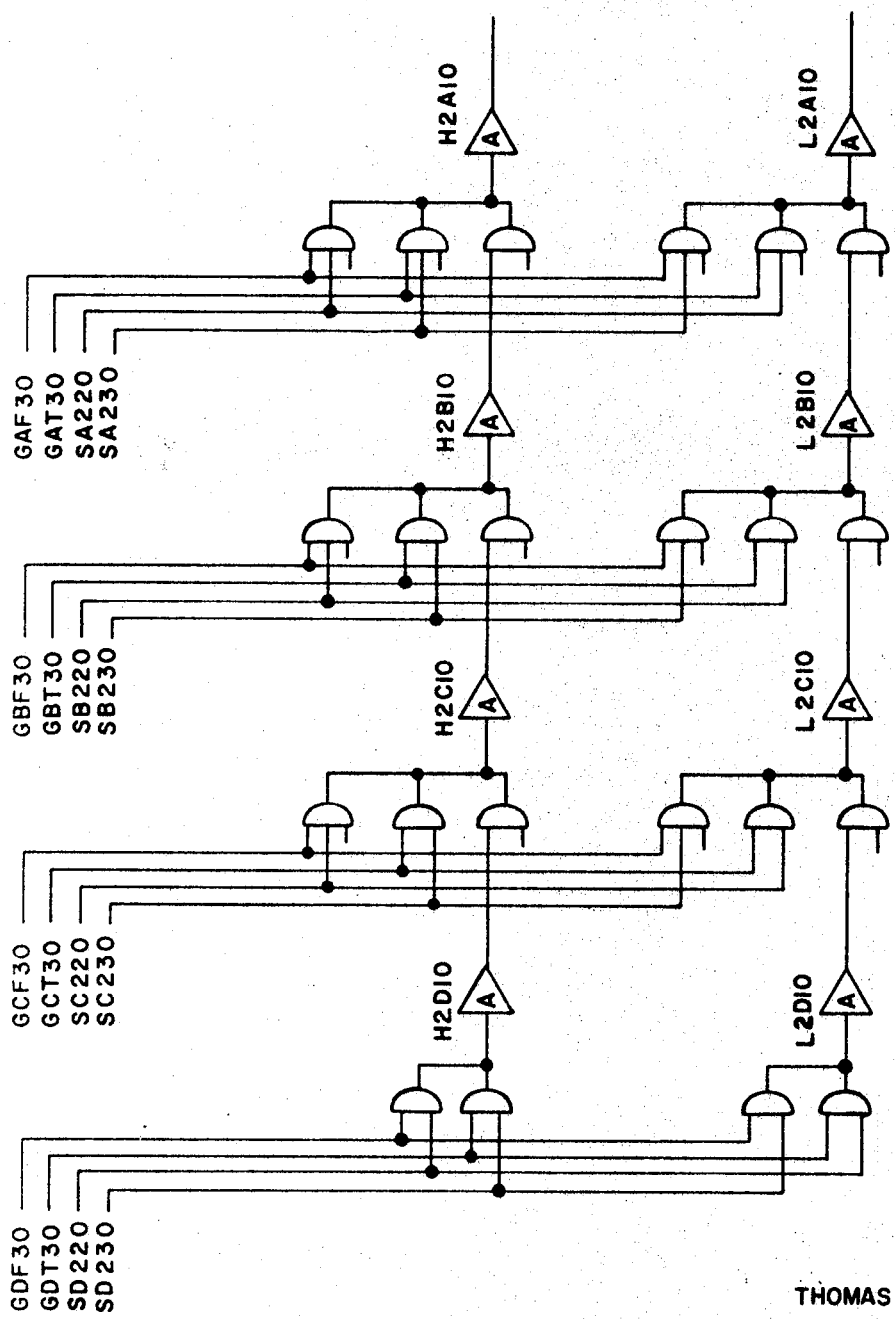
FIG. 10-B

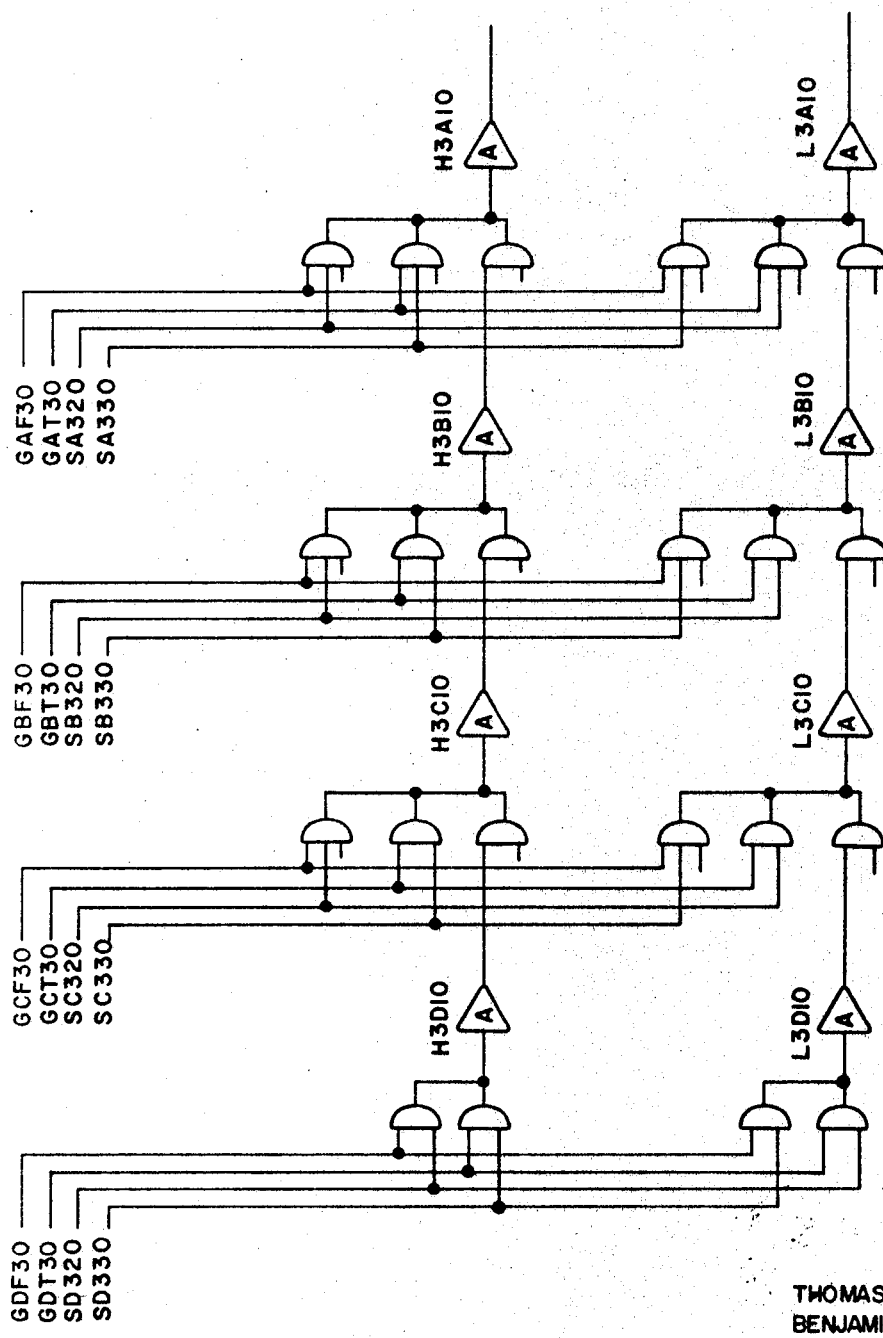

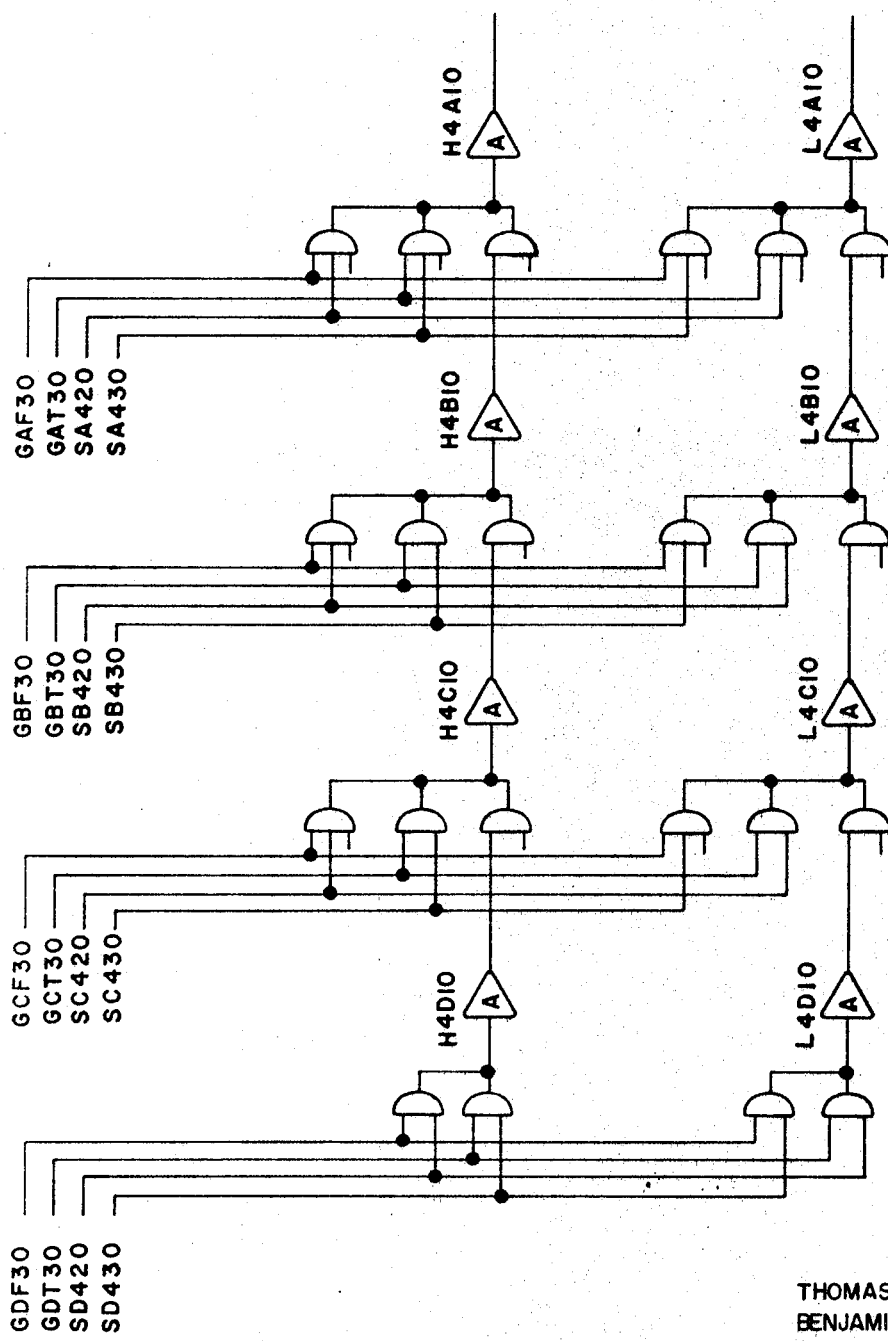
FIG. 10-D (CONFLICTING 4th BIT)

United States Patent Office 3,445,635
Patented May 20, 1969

---

3,445,635
DECODING ARRANGEMENT
Terrance Trickett, Bedford, Donald J. Zepp, Wellesley,
Benjamin Horne, Needham, and Thomas Brill, Cochituate, Mass., assignors to Honeywell Inc., Minneapolis, Minn., a corporation of Delaware
Filed Apr. 14, 1966, Ser. No. 542,534
Int. Cl. G06k 7/01
U.S. Cl. 235—61.11          16 Claims The present invention relates to vertical di-bit code patterns; more particularly, the invention relates to automatic decoding means for such patterns, the decoding means being simplified and requiring a simplified bar-detector arrangement with a minimum of output memory locations therefor; also being self-registering and incorporating code-locating gating means for gating out the contents of these memory locations in a prescribed manner upon detection of di-bits at prescribed positions relative the detectors; this decoding means further being self-synchronizing, self-checking, self-locating and relatively insensitive to vertical mis-registration of the code patterns.

Bar code recognition is susceptible of wide usage in the art of automatic document reading, especially as related to data processing systems. The present invention contemplates a bar code of the type comprising vertical di-bit marks. Such di-bits comprise horizontally adjacent bit-cells arranged along a prescribed center axis, each cell having a machine-readable "mark" in one or the other of two complementary cell-portions, each mark consisting of a uniform area exhibiting a prescribed detection characteristic (e.g. optical blackness, i.e. relatively low reflectivity) different from the associated "background characteristic" of the document (e.g. document whiteness, i.e. higher reflectivity). One object of the invention is to provide means for interpreting such di-bit codes. A related object is to provide such interpreting means which also automatically monitors the validity of such di-bit marks.

The wide usage possible with such bar coding schemes has prompted efforts to simplify the decoding means therefor so as to keep it inexpensive, convenient and relatively trouble-free. The invention has provided a major step towards such simplification by radically reducing the number of storage locations required in decoding. More particularly, the invention provides a bank of mark-transducing sensor means and requires output storage means to be coupled to only a few prescribed ones of said sensor means, coupling other sensor means to registering gating means associated with one of these storage means; thereby eliminating the need for storage means at the output of each sensor means, as might be expected. For instance, using a bank of ten sensing photocells, the invention can effectively decode a mark-pattern passing across any path spanned by the bank, and yet need provide only two output storage means therefor, each coupled to a prescribed photocell. It will be evident to those skilled in the art that such a major reduction in components is much to be desired, especially when, according to the invention, it sacrifices nothing in accuracy, but on the contrary, provides added decoding information. Thus, another object is to provide such interpreting means which are simplified. A related object is to provide added decoding information despite this simplification.

Besides accomplishing the above-mentioned simplification, the decoding arrangement according to the invention provides an unexpected bonus in decoding information, providing such added advantages as: automatic check of di-bit validity; code verification by multiple detection of di-bit halves, to thereby indicate which half is being detected; and the flagging of ambiguous output results (heretofore undetected). This added information is derived with no special components, being automatically provided by those associated with the primary decoding means. Thus, a further object is to provide such di-bit decoders which provide added information regarding code validity and the like.

The invention further provides means which are uniquely apt for providing special di-bit decoding information, such as means for detecting invalid (no-transition) di-bit characters, means for recognizing the start of a di-bit character from extraneous noise, and the like.

Another object of the invention is to provide a novel bar code interpreting arrangement exhibiting the aforementioned features and advantages. Other objects and feature advantages will become apparent from the following description of a preferred embodiment of the invention as illustrated in the accompanying drawings.

According to the described embodiment of the invention, the above objects are effected by providing a decoding arrangement for optically sensing a vertical di-bit bar code pattern on passing unit records, this arrangement including a plurality of sensor means arranged to monitor all likely transit paths taken by the images of these passing patterns; a plurality of signal storage registers, each being coupled to the output of prescribed "reading" ones of these sensor means and adapted to store a prescribed (character-bit) number of successive bit-representing output signals therefrom; a plurality of pairs of registering/gating means, one pair being operatively associated with each of said storage means for gating output signals therefrom, each gating means being coupled to the outputs of a reading sensor and an adjacent "gating" sensor means, each of said gating pairs comprising a "True" and a "False" decoder arranged to selectively gate out the contents of the associated storage register, directly or as inverted, respectively, when associated "gating" and "reading" sensor outputs are unlike, indicating di-bit "centerline" registration adjacent that "reading" sensor. The arrangement also includes a plurality of further output decoding means and associated timing and error check means.

In the drawings, where like reference numerals denote like elements:

Figure 2:
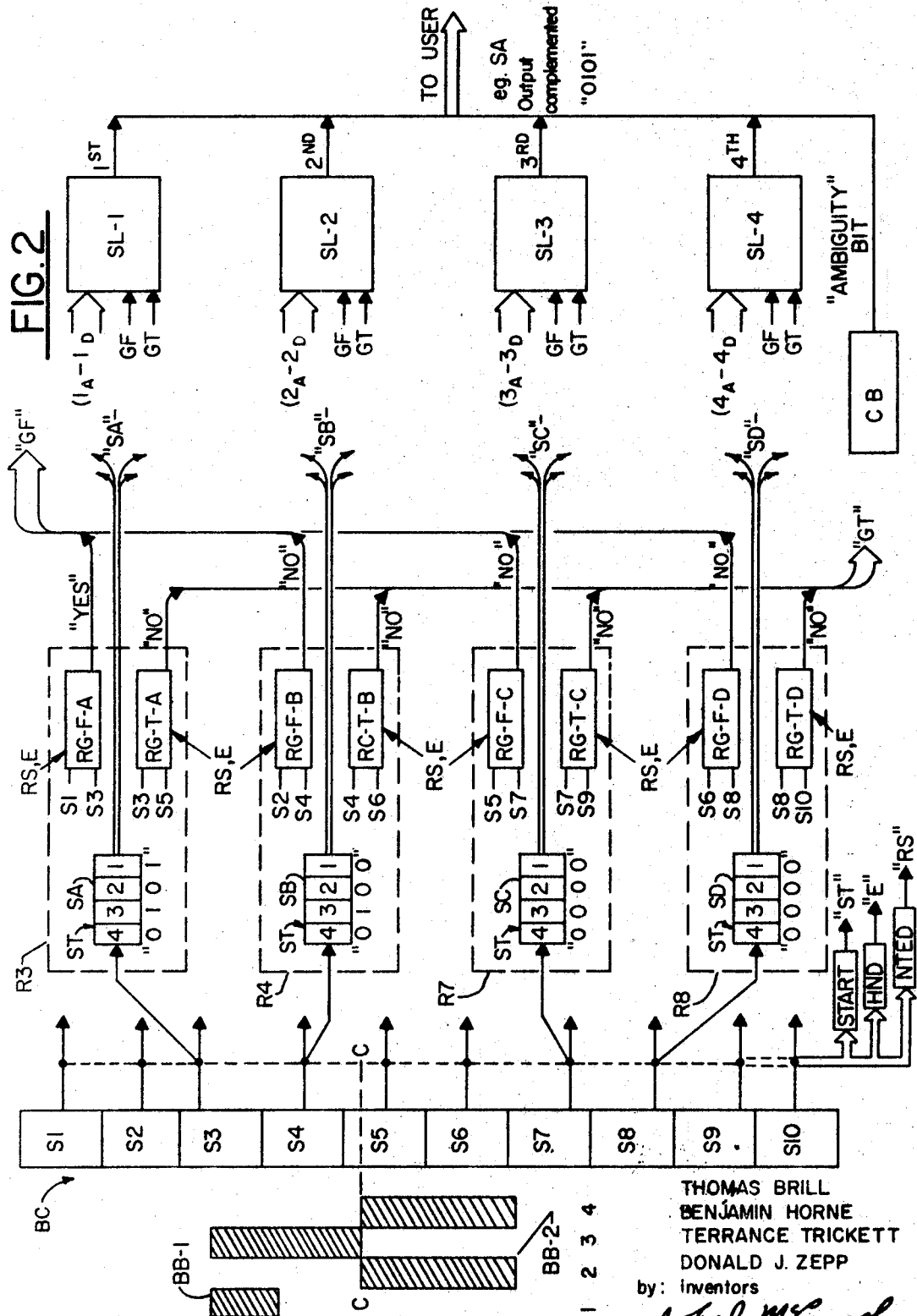
FIGURE 2 is a more detailed block diagram illustrating a preferred implementation of the arrangement in FIGURE 1, indicating a representative bar-code pattern and related decoding signals.
Figure 3:
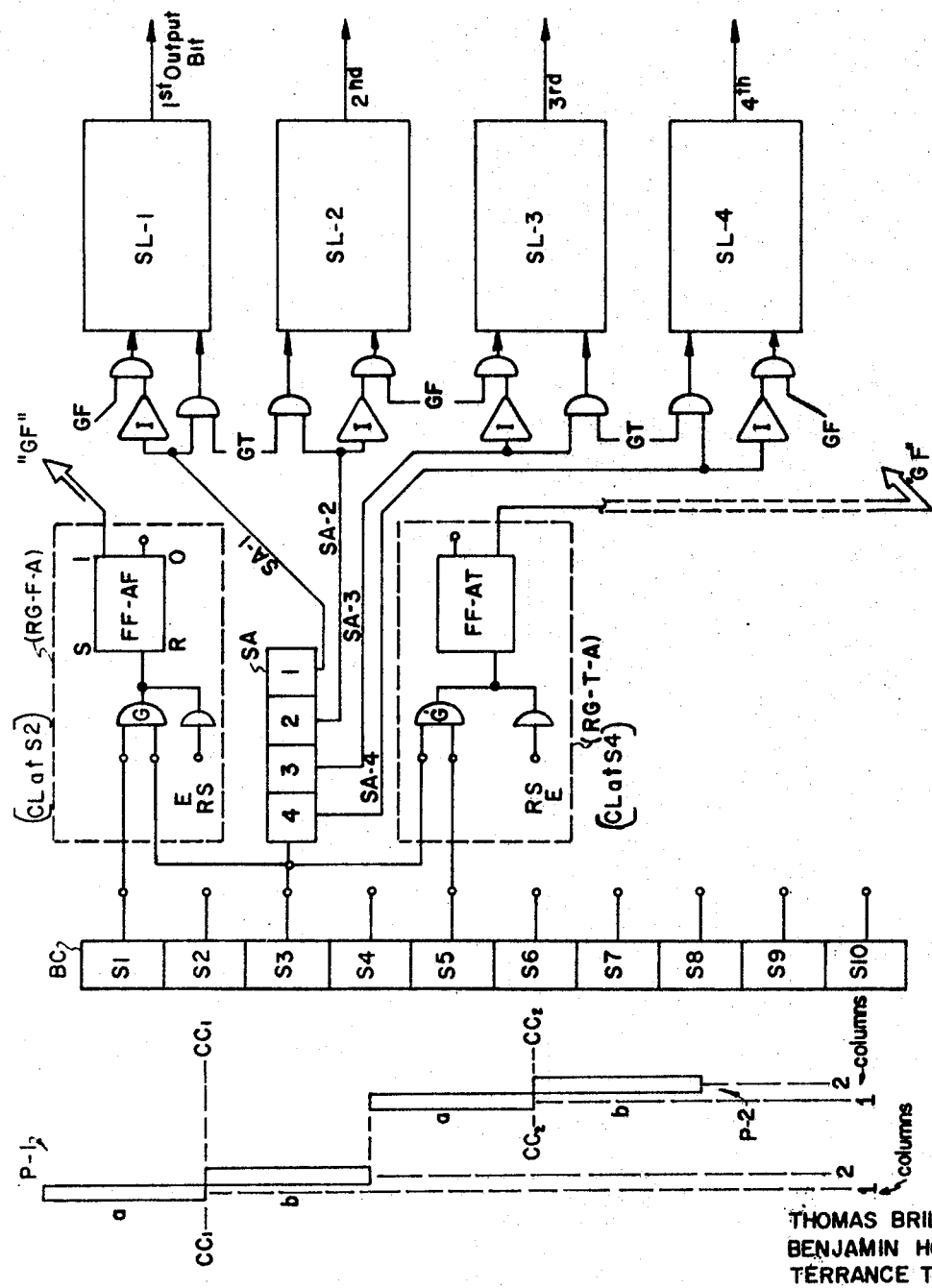
FIGURE 3 is a more detailed block diagram of an exemplary read signal memory and associated gating means portion of the arrangement in FIGURE 2, also indicating a pair of different code patterns.
Figure 7:
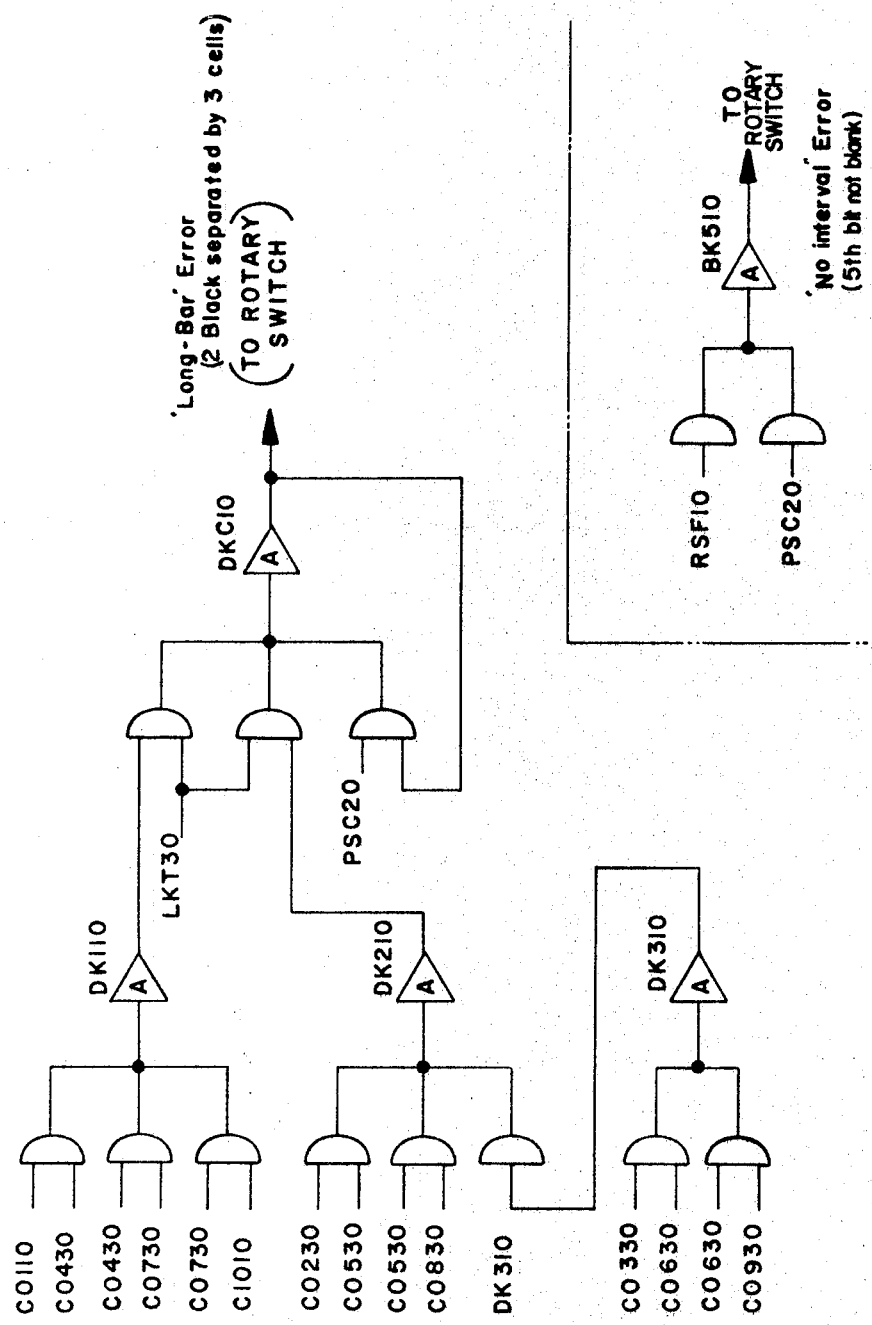
Figure 8:
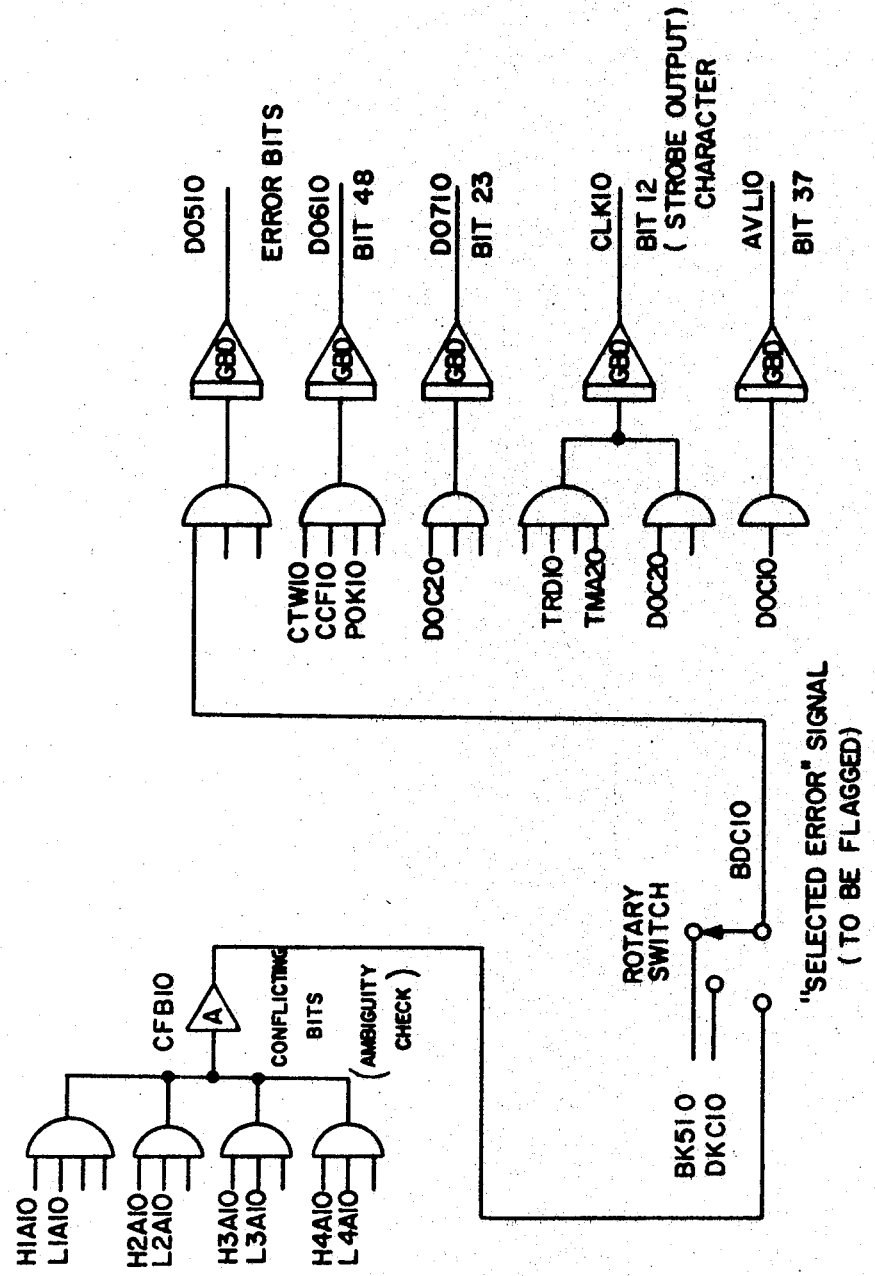
Figure 9:
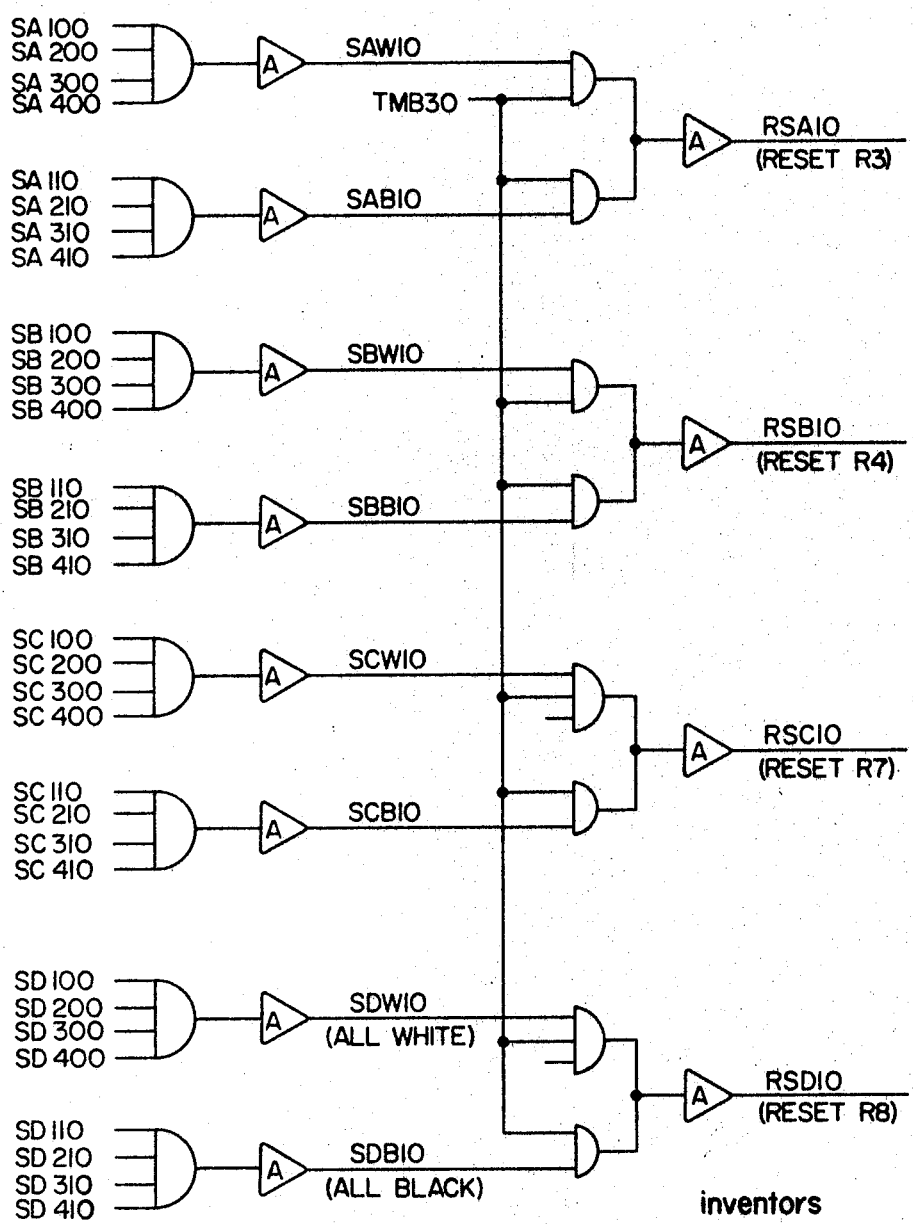

FIGURE 4 indicates schematically a portion of one decoding stage from the arrangement of FIGURE 3, together with a special code pattern arrangement; while FIGURE 4$_B$ indicates the detecting state of various sensors in FIGURE 4$_A$ at various times;

FIGURES 5$_A$ through 5$_D$ comprise detailed logic diagrams implementing the memory means and associated gating means for each of the four decoding stages indicated in FIGURES 2 and 3;

FIGURES 6$_A$ and 6$_B$ show details of the four output selection units indicated in FIGURES 2 and 3;

FIGURE 7 shows detailed logic for detection of two types of errors which may be selected for detection;

FIGURE 8 shows details of the output logic associated with error indicating means schematically indicated in FIGURE 2 and elsewhere;

FIGURE 9 shows details of the "no transition" detecting/checking means, "NTED," indicated in FIGURE 2; and FIGURES 10$_A$ through 10$_D$ detail logic implementing the ambiguity check means "CB," indicated in FIGURE 3, for the four output bit locations.

Figure 1:
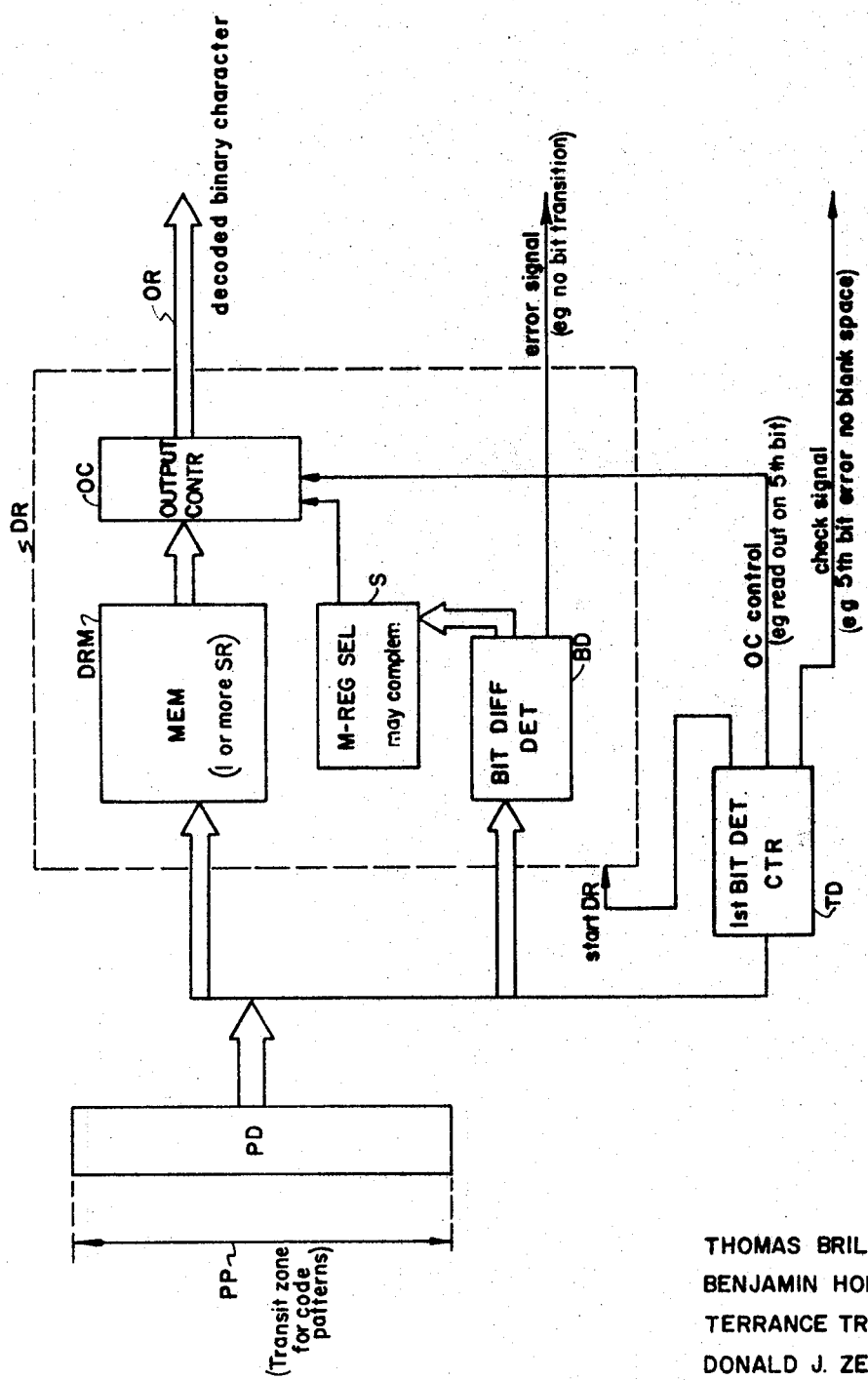
FIGURE 1 is a schematic block diagram of a bar code interpreting arrangement according to the invention.

With reference now to the drawings, a bar-code sensing station PD is schematically indicated in FIGURE 1 for interpreting passing bar code (image) patterns along various transit paths, through a prescribed transit zone PP, according to the invention. For instance, PD may comprise an array of ten photo-transducers S1–S10 aligned along a transducer bank BC, as in FIGURE 2, so that certain transducers (e.g. S3–S6 indicated) will signal the passage of a bar-encoded character (BB), being activated by sequential passing of bar portions (e.g. BB–1, BB–2) to modulate the radiant energy input thereto. This optical bar-code arrangement is merely illustrative of the type suited for use with the novel bar code detecting and associated decoding scheme, according to the invention, and equivalent codes will occur to those skilled in the art. The read sensor means and associated memory storage for the indicated arrangement are detailed below in the description of FIGURES 3 and 5; while the decoding means are detailed in the description of FIGURES 5–10. It will be understood that the read station including sensor bank PD (or BC) will also include document transport means for translating encoded documents successively along a reference surface in a prescribed transport direction (though these are not shown, being conventional) so as to image sequential code marks to be sensed by the detectors (e.g. photocell array BC). As will be seen below, it is a feature of the invention that the decoding arrangement associated with transducers BC is self-synchronizing and can tolerate variations in transport speeds; some such variations being inherent in virtually every transport device. Unless a decoding arrangement is so self-synchronizing from character-to-character relatively minor changes in transport speed can destroy reading accuracy.

Thus, the general opto-mechanical operation of the optical reader arrangement whereby it senses bar-code marks will be conventional and thus will be understood by those skilled in the art. Prescribed illumination means may generate sensor-detectible bar-code reflection images of each bit in a character pattern (e.g. pattern BB) sequentially, being magnified by a conventional lens arrangement. Thus, images of successive bar code patterns are projected, column-by-column and bar-bit by bar-bit, onto prescribed ones of the cells in bank BC. The spectral characteristics, frequency and intensity of the illumination are adjusted so that the photocells in bank BC are suitably responsive to reflections from the bar-code marks, these marks preferably comprising black printing on white stock, or otherwise comprising any discrete indicia whose presence on a document is perceptible to the read-sensors. Thus, the photocells in bank BC will read along successive columnar portions of a document to sense the images of one or more bars in successive column-locations at successive strobe times. The imaged cells will thus provide bar-indicating output signals for each "mark-column," self-locatingly and self-synchronously, to thereby sense and transduce character patterns on a document as it is transported past read bank PD (BC).

Conventional transport means are prone to uncontrollably shift the vertical position of documents as they translate them, transport jitter and document skew commonly causing this. Thus, one must expect some vertical shifting in the position of the bar images along the translation direction, such as to shift registration thereof between different groups of imaged cells; at times, on successive documents and at times, along a single document. Various other common causes may also induce vertical mis-registration, such as bar-code printing misalignment, distorted printing and off-axis document cutting (e.g. the bottom edge of the document being rough and jagged). Similarly, character skewing, i.e. displacements of a bar mark from registration along reference axes of the reader, may cause different imaged cells to go active. Cell bank BC is therefore extended (along zone PP) to bracket all likely image-transit paths. While prior art bar-code arrangements and associated interpreting means are characteristically upset by such vertical shifts in mark/transducer registration, the bar-code pattern according to the invention, being self-locating and self-strobing, minimizes such problems; further, the preferred decoding means, according to the invention is insensitive to them, as detailed below.

Characters are encoded, according to the invention with bar-code patterns, exemplified by character patterns BB; P–1, P–2 and bi-biv; in FIGURES 2, 3 and 4 respectively, or by similar patterns. All the bars (i.e. bit marks) for each coded character lie adjacent horizontally (and vertically also, if desired as in the preferred bar-code illustrated) and are separated by an inter-character space. It will become apparent to those skilled in the art that a feature of the invention is that the images of the bar-encoded characters may shift in vertical position (i.e. along sensor bank BC) or in lateral position (transverse to bank BC), possibly imaging different groups of detect cells S1–S10, without upsetting the interpreting logic. Unlike known reading means, the bar-code reading logic arrangement of the invention may be totally free of means for determining absolute position of the code, measuring it relative to the detectors, controlling sensor registration or the like.

Decoding generally

A novel system for detecting and decoding the above-indicated bar-code character patterns according to the invention is indicated very generally in the block diagram of FIGURE 1, details of a preferred embodiment thereof being more particularly shown in FIGURE 2, which is, in turn, further particularized in FIGURES 3 and 5–10. FIGURE 1 indicates, schematically, a novel decoding arrangement apt for use with the above-described code; an arrangement which exhibits, a surprising simplicity, eliminates the usual clocking and code registering means, and yet decodes with satisfactory accuracy for most applications. Further, this novel decoder is susceptible of convenient use with very advantageous supplements, such as a "complement checking" arrangement, a "dual threshold" detecting arrangement and the like.

In general, FIGURE 1 shows a bar-character detecting means PD connected to a decoder means DR which interprets the output signals therefrom and also to a sequence detecting means TD, the output of which controls (e.g. sequences) decoder DR, indicates code errors and the like. Mark detector PD comprises plural sensor means responsive to bar marks over all likely transit paths thereof, detecting mark images over a bracketing reference zone PP (similarly for detector bank BC in FIGURE 2). Detector PD may also include output amplification means where required. The output signals from prescribed sensors of detector PD are applied each, to a prescribed portion of decoder means DR, being sequentially stored in memory means DRM therein. DRM is arranged to store bit outputs from selected sensor means in PD, the number of output bits stored corresponding to the number of bits per character (e.g. four indicated). Memory DRM is arranged to provide the decoded word output OR at prescribed times, under the control of output control means OC. Control OC is arranged to select prescribed memory locations in DRM and gate them out, either directly or as complemented, according to indications from select means S. Select means S is adapted to selectively indicate which memory locations are read out and whether or not they are to be complemented during readout, being controlled by a bit-difference detector means BD. Difference detector BD may be arranged to compare vertically adjacent sensor outputs at each bit time, to detect the relative location of "di-bit centerline" (see C—C in FIGURE 2) and gate out the sensor-memory register subcombination which is "reading" adjacent this centerline. BD can also gate out complement-reading means after inverting the output and thus provide automatic "di-bit check" and the like. BD may also provide an automatic check for "no-transition" errors, and other departures from coding rules, as indicated. Decoder DR is initiated by a "start" signal from sequencing means TD after TD has detected a valid "first-bit." Thus DRM may be read-out by TD when it determines "last bit" time, such as by a counter, delay means or the like (set to indicate completion of a word). TD may also provide a check for invalid code patterns, such as by indicating erroneous bit-marks at inter-word times (e.g. no inter-character blank space after the 4th bit in a 4-bit word).

FIGURES 2 and 3 indicate, in block diagram form, a novel decoding system embodiment of the arrangement in FIGURE 1 according to the invention, adapted for interpreting vertical di-bit characters like those shown. It will become apparent to those skilled in the art that a feature of the instant decoding arrangement is that it uses a minimum of sensor-output storage locations (e.g. only 4 for a system of 10 sensors). Another feature is that it employs a novel "center-line detection" gating arrangement for controlled readout of the contents thereof.

More particularly, as shown in the schematic block diagram of FIGURE 2, an array BC of ten adjacent photosensors S1–S10 and associated output amplifying means (not particularized) is arranged in bar-detecting relation with an exemplary bar-encoded character image BB. It is a particular feature of the invention that the number of output memory registers associated with sensors S1–S10 is radically reduced from what might be a conventional ten (1 per sensor) to a mere four (i.e. registers SA, SB, SC, SD). In addition, the invention multiplies the information content of these registers. Thus, this arrangement not only stores character-detecting signals for subsequent decoding, but also provides a number of validity-checks (or di-bits; of characters; etc.) and the like. Therefore, the invention provides a radical simplification over expected prior art arrangements as well as improved performance.

Character-detecting registers SA, SB, SC and SD are provided at the outputs of sensors S–3, S–4, S–7 and S–8, respectively. Each register forms part of a "registration-selected" reading stage, including a pair of upper and lower "center-line detection/gating" means adapted to provide output signals reflecting the appearance of a "di-bit" type center-line CC (cf. FIGURE 3 also) between upper and lower di-bit halves. CC is indicated as detected above or below a particular character-detecting sensor, the output thereof being controlled by such detection means accordingly. Thus, associated with each character-detecting register S, a pair of upper and lower center-line detection means RG–F, RG–T, respectively is provided. Detection means RG comprise part of a plurality of registration arrangements R3, R4, R7, R8, each being associated with a register, i.e. with SA–SD, respectively; and specifically including upper/lower detection means RGF – A/RGT – A; RGF – B/RGT – B; RGF–C/RGT–C and RGF–D/RGT–D, respectively. Each register S is filled in accordance with prescribed timing signals "ST," as known in the art.

Registration arrangements R, and upper and lower detectors RG–F, RG–T thereof, will be better understood by reference to FIGURE 3 which particularizes the details of an exemplary one thereof, namely arrangement R3 and detectors RG–FA, RG–TA thereof, associated with register SA. As FIGURE 2 indicates, the outputs from all eight upper/lower detectors (RG) are connected in parallel to each of four output selection units SL1, SL2, SL3 and SL4, each unit providing one of the four binary character-bits making up the decoded output character signal. Also connected to selection units SL1 through SL4 are one of the four output bit-signals from each of the registers SA–SD. More particularly, each of the four memory cells 1–4 in each register is connected to a corresponding output selection unit (SL); for instance, all "first-bit" memory cells (SA–1, SB–1, etc.) being connected to associated first-bit selection unit SL1; all the "second-bit" memory cells (SA–2, SB–2 etc.) being connected to "second-bit" unit SL2, and so on.

According to another feature of the invention, the decoding system indicated in FIGURE 2 is, in most instances, adapted for making a "character-validity" check, and doing so automatically, so that invalid or ambiguous characters may cause the generation of an "ambiguity bit" (e.g. a 5th output bit). This "check bit" may be generated by an output checking means CB in the event that two or more "valid but different," outputs appear from registers SA–SD. This ability to indicate the "level of confidence" of decoded character output, is effected by the novel multiple bar detection technique and subsequent associated validity comparisons, and is a new and powerful tool—one not presently available in the art. The generation of such an "ambiguity bit" can flag potential decoding errors which go unnoticed in other systems. The details of checking arrangement CB are more particularly indicated in the logic diagrams of FIGURES 8 and 10A–10D, illustrating means for indicating ambiguity for each of the output bits in a character, i.e. #1, 2, 3 and 4, respectively.

A related validity checking means NTED is characterized as a "no-transition (error) detector" and comprises means for sensing and indicating the absence of any "bit-transition." It will be understood that the absence of a bit-transition (i.e. of a shift in the "active-sensor" pattern) constitutes a departure from the encoding rules, resulting in an invalid character. The error signals (RS) from stage NTED are applied, as indicated (being particularized in FIGURES 5A–5D) to reset flip-flop memory units FF in center-line detectors RG after the occurrence of the fourth bit in each character, this being indicated by timing signals "st." The details of detector means NTED are particularly shown in FIGURE 9.

A preliminary summary of the operation of the system indicated in FIGURES 2, 3 will help to further clarify the subsequent description and understanding thereof and of the logic circuit embodiment implementing them, as shown by FIGURES 5–10. Thus, for each multi-bit, bar-encoded character, the following generic operations are performed (refer to FIGURE 2):

*(1) Fast restart*

First in order to reject horizontally-oriented noise marks, a "fast restart" operation is performed by a horizontal noise detector HND. When characters are bar-coded according to the invention, they comprise adjacent bits separated by an inter-character space and may be self-synchronized, in that the "strobe clock" may be started each time an initial (character) di-bit is sensed at sensor bank BC. Thus, timing means may be provided in HND for checking the validity of this initial mark by checking for the sensing of a second valid di-bit mark within a prescribed (inter-bit) time adjustable according to print-spacing, transport speeds, etc.) indicating proper adjacency of intra-character bits. The absence of this second mark causes HND to generate a "restart signal" "E," causing the system to effectively ignore noise marks (such as stray pencil marks, dirt, etc.) that do not conform to the vertical di-bit encoding pattern.

*(2) Check of bit validity*

Four "valid" black bars are successively sensed (for a 4-bit character) by those sensors in bank BC which are indicated as "centered" (adjacent center-line CC of the mark pattern) on the code pattern, according to the invention. Four sensor outputs are sequentially stored in each register S, being stepped through the four memory cells therein (as indicated by "1," "0"); while, for each bit, a "di-bit check" is automatically performed by the registration detectors RG associated with that register, according to the invention. Accordingly, as each bit is stepped in to a register S, any detector RG which does not bracket a centerline, (i.e. which sees the same, or equal, outputs from its associated position-sensors—e.g. sensors S–1, S–3 for RG–F–A) at any bit-time, will be then "reset" (disabled). This leaves all un-reset detectors "ON" at the end of the fourth bit time only if they have "seen" four successive centerlines, any single loss of center-line recognition having disabled them for this character sequence. Such "ON" detectors RG will then indicate "centered" mark-sense signals in their associated register and allow readout therefrom; also indicating either that the bit signals therein are true (RGT's do this) or "false," i.e. inverted (RGF's do this, complementing the read-out). Thus, for each decoded character, four outputs from sensors S–3, S–4, S–7, S–8 will enter associated registers SA, SB, SC, SD respectively, as "ones" ("mark sensed") or "zeros" ("blank," i.e. white space, sensed), during each character time.

(3) *Check for invalid character patterns*

The next step after reading in four bits (one character) is to reject those characters which passed the "di-bit check" but nonethless constitute invalid "no-transition" characters, the register contents being either all "ones" or all "zeroes." This no-transition check is made by stage NTED and resets those detectors RG associated with any register containing such a "no-transition character." Thus, these invalid characters are eliminated so as not to be considered in the following ambiguity check.

(4) *Ambiguity check*

Next, "ambiguity check" is performed whereby the remaining "valid" charcter-bit outputs are checked to see if two or more different characters were detected as "valid"; if so, this may be flagged. Other errors may also be indicated at this time.

(5) *Read-out*

Read-out may now be performed, whereby the four valid, verified bit-signals constituting a valid decoded character signal, plus related check bits, may be transmitted to utilization means.

In brief, then, the operation of the bar code sensing-decoding arrangement in FIGURE 2 performs the steps, in order, of: (1) checking for horizontal noise (fast restart); (2) checking for valid di-bits and storage thereof (valid bit detection); (3) checking for valid character patterns (bit-transition; etc.); (4) checking "valid" decoded character pattern for ambiguities; and (5) read-out.

The details of FIGURE 3 will now be further described to exemplarily indicate the aforementioned center-line registration detection/gating for one registration gating arrangement R3, associated with shift register SA, a pair of true/false center-line detcetors RGF-A, RGT-A being included therein. The indicated structure and operation is exemplary and will also apply to like register/gating arrangements R4, R7 and R8, as will the interconnection thereof with output selection elements SL–1 through SL–4. As FIGURE 3 is described, more particular details of elements therein may be found in FIGURES 5–10, which may be consulted for the following elements: FIGURE 5A shows further details of registration detector/gate R3, including shift register SA and detectors (RG–A) thereof FIGS. 5B, 5C and 5D similarly show the details respectively, of registration gates R4, R7, and R8. FIGURES 6A and 6B show details of the output selection units SL–1, SL–2 and SL–3, SL–4, respectively. FIGURE 7 shows detailed logic for implementing a vertical noise detection means which may be used to flag improper operation. FIGURE 8 shows details of the output logic associated associated with error-indicating signals. FIGURE 9 shows of the logic arrangement comprising "no transition" detector NTED. FIGURES 10A through 10D detail the logic associated with each of the four output bit-locations, respectively as associated with ambiguity check (i.e. "conflicting bit") indicating means CB.

FIGURE 3 thus outlines the logic arrangement of decoder R3 interconnecting shift register SA and center-line detector means RG-FA, RG-TA, with associated sensors S–1/S–3; S–3/S–5 as well as with output selector units SL–1 through SL–4. The ten sensors S in bank BC are shown in sensing relation with a pair of exemplary "two di-bit" character patterns P-1, P-2, a modification of the "four di-bit" character (BB) in FIGURE 2. It will be understood that, while they are not shown, the analogous elements associated with the other three gating arrangements R4, R7, R8 and associated shift registers SB, SC, SD may comprise the same structure and operation. The logic associated with each of the latter gates is indicated more particularly in FIGURES 5B through 5D, respectively; while the interconnection thereof with output selection units SL–1 through SL–4 is indicated particularly in FIGURES 6A, 6B.

Register SA will thus be seen to store either assertive or negative mark-sensing signals (i.e. "1's" or "0's," respectively) successively at strobe times (ST) in the four memory cells thereof (SA1 through SA4; the number corresponding to number of bits per character). The binary state of these signals will depend upon whether sensor #S–3 "sees" black marks or the "white" background while scanning the column locations during bit-times I-IV for a given character (see also FIGURE 4). These output signals, indicated as "SA–1"–"SA–4," are applied to output selection units SL–1 through SL–4 respectively, as indicated. Thus, an assertion (A–1) or negation ($\overline{A}$—) of these signals enters units SL under the gating control of decoding signals "GT," "GF," respectively, as indicated.

That is, gating signal GF from "false" gating unit RG–FA will gate the negation (inversion) of signals "SA–1" through "SA–4" into selection units SL–4 through SL–4, respectively, at "end-of-character" time, i.e. when the sensors S1, S3 thereof indicate four successive valid di-bits (unequal outputs from S1, S3 indicating "centerline" $CC_1$ therebetween, i.e. roughly along the detect axis of sensor "S2"). Conversely, control signals "GT" from "true" gating unit RG-TA will gate the assertion of signals "A–1" through "A–4" into selection units SL-1 through SL–4, respectively, when four successive "di-bit inequalities" are indicated by position sensors S3, S5 thereof, being registered roughly along sensor S4 (centerline location for RGT–A). Decoders R3 etc. thus operate to reference centerline location, as well as to check di-bit validity and also indicate whether a bar-code or its inversion was read, this latter feature presenting an opportunity for two self-checking detection steps.

More particularly, the elements of decoder arrangement R3 operate as follows. Detectors RGF–A, RGT–A each includes an input gate means (G, G' respectively) of the "Inverted Exclusive-OR" type, connected to reset an associated flip-flop storage signal generating means (FF–AF, FF–AT respectively). Gate G may be characterized as an equivalence logic gate which will provide a "high" output to reset FF only when both inputs are the same, that is, when S1, S3 are both high or both low (no di-bit centerline indication, therefor); and similarly for gate G' and sensors S3, S5. Flip-flops FF are arranged to be initially "set" at the start of each character scan (e.g. by "initial-bit" detection) and to be selectively reset by input gates G, G' at bit-times when the associated sensors thereof indicate no sensed difference, i.e. "no di-bit." Error conditions can also reset FF, such as "no transition" error signals RS, etc., as aforementioned. Thus, as the (four) bits associated with each character pass sensor bank BC to be scanned successively by registering sensors thereof, all storage registers will be disabled (by absence of a gating signal, GT, GF thereat) except those which are associated with a gate means (RG) which indicates "di-bit-ness," (i.e. "centered read-sensor") for all bits. Thus, all flip-flops FF e.g. FF in RGF–A) will be reset, and rendered inactive for gating out the bit signals into SL, at times when no centerline is indicated along a prescribed associated bit-detecting sensor, i.e. along a read sensor (e.g. S2) for the register associated with that gate means (e.g. SA with RGT–A or RGF–A) and disposed between position-sensor pairs thereof (e.g. between S1, S3). It may be noted that bar mark images (*a,b*) must be from about 3 to about 7 sensor-apertures high (a nominal four sensor apertures high).

Error signals "E," "RS" are provided to reset flip-flop FF in certain cases, such as in respond to detector NTED indicating "no transition." That is, when no bit-transition is detected (either the character is illegible or the centerline is outside the area bracketed by bank BC), signal "RS" will reset all detector gates RG.

FIGURES 4A, 4B illustrate an example of a case where such "no-transition" indication and control is useful. FIGURE 4A shows an exemplary character pattern PT comprising bar images *bi, bii, biii, biv* located along center-line C—C, bracketing sensors S1–S5 in bank BC. "Read" sensors S3, S4 are schematically indicated as connected to activate registers SA, SB, respectively, while "centerline-detect" sensor pairs S1–S3; S3–S5; S2–S4 and S4–S6 are connected to activate decoder gating units RGF–A, RGT–B and RGT–B, respectively, as shown. FIGURE 4B indicates the binary (mark-detecting) states of sensors S1, S2, S3, S4 and S5 at successive bit-times: I, II, III, IV. The problem here is that the detecting condition of the sensors may give ambiguous, unpredictable binary outputs for bar marks at certain positions with respect to the sensors. For instance, sensors S1 and S5 may be so located with respect to bars *bi, biii, biv* and *bii*, respectively, that one cannot predict whether they will detect bar-presence ("1") or absence ("0") as is indicated by symbol "?" in FIGURE 4B. The problem is the same for sensor S3, focussed along centerline C—C since, for instance, one cannot be sure if sufficient white area exists for "zero" output. Correct detection should, of course, be performed by sensor S4, reading the negation of character PT into register SB as indicated by decoder RGF–B (since S2, S4 will apply unequal outputs to RGF–B at all four bit-times).

However, it is possible in this situation that S3 would read all ones ("1–1–1–1" into SA) while either S1 would "see" all zeros ("enabling" gate means RGF–A) or S5 "see" all zeros ("enabling" gate means RGT–A) or worse, both conditions could occur. Such would provide an ambiguous, confused decoded output and both outputs SA and SB might be read out, (causing generation of an "ambiguity bit" as well). However, NTED should prevent this by resetting RGF–A and RGT–A (signal "RS") before readout (after last-bit-time: IV), but before readout time.

This case illustrates the aptness of the decoder of the invention for simple supplemental decoding means. It will be apparent to those skilled in the art that the sensing decoding arrangement in FIGURES 2 and 3 may be modified somewhat and/or equivalent means substituted, for all or a part thereof, to operate as above within the scope of the invention as defined by the appended claims.

The operation of gate means RG to gate out decoded character signals into selection units SL will be more clearly evident from the following, with reference to FIGURE 3. The arrangement here is adapted to decode a two di-bit word (rather than a four di-bit word, as in FIGURE 2), the characters (e.g. P–1, P–2) having upper or lower bars (*a, b*). The passage of column #1 and initial bar "*a*" of P–1 past sensing bank BC will cause sensor S–3 to read "zero" ("no bit mark" sensed in column 1), while a "one" output (bar sensed) will appear then on S1, which, with the "zero" output on S3, will prevent gate G from opening to reset flip-flop FF–AF. RG–F–A will thus indicate a bit-transition (in the area of sensor S2) and not be disabled during this first bit time. Contrariwise, however, companion decoder RGTA will be reset (disabled), since the outputs of sensors S3, S5 on associated gate G' will be alike ("zero-zero"), indicating no di-bit center-line between sensors S3, S5 at this bit-time. It will be noted incidentally that sensors S3, S5 will later view a "bit transition" (bar *b* of P–1) during the second bit-time (II); but, having once been disabled (during the first bit time), flip-flop FF–AF thereof cannot be enabled to provide a "GT" output until the next character sequence.

Similarly, during the second bit time, gating control unit RGF–A will also escape being disabled, since there will again be dissimilar sensor outputs on gate G (from sensors S1, S3, sensing along column #2—S3 senses bar *b*; S1 does not) to prevent the resetting of flip-flop FF–AF. Thus, bar-encoded character P–1 would be read out of shift register SA and gated, complementingly, into output bit units SL1, SL–2. That is, signals "0, 1" will be applied to SA1, SA2, respectively, and, when combined with the "false" gating signal "GF" from RGFA will cause the binary "complement" thereof (i.e. "1, 0") to be applied to selection units SL–1, SL–2 respectively; the output character thus comprising: "1, 0." In this fashion, character signals may be gated out of registers SA–SD, either directly under control of associated "true" gating means, RGT; or invertingly under control of "false" associated gating means RGF. Of course, during the PA–1 decoding sequence, the other shift register control units RG will have been disabled, there being like logical inputs to the flip-flops thereof and no bit-transitions to be detected. It may be appreciated that a similar bar-encoded character P–2 may likewise be read by signals gated from register SC (at the output of sensor S–7—see FIGURE 2), there being "active" gating output signals "GF" from the "false" (inverting) associated gate means RGF–C, indicating two successive di-bit (center-line) detections by associated sensors S5, S7.

The aforementioned detector means may be modified as understood by those skilled in the art to accommodate certain changes in code mark patterns similar to the changes aforementioned and may also be used to detect code mark indicia other than the optical blackness" (on white background). Also, the described decoder arrangement though particularly suited for decoding vertical di-bit patterns may also be employed for related patterns. Thus, the principles of the invention described in the above embodiment may be implemented in a number of different ways evident to those skilled in the art. While, in accordance with the provisions of the statute, there have been illustrated and described above, the best forms of the invention known, it will be apparent to those skilled in the art that changes may be made in the form of the apparatus and the encoding scheme in the arrangement of parts and the like without departing from the spirit of the invention, as set forth in the appended claims; and that, in certain cases, some features of the invention may be used to advantage, or replaced, with or without a corresponding change or replacement of other features.

Having now described the invention, what is claimed as novel and is to be secured by Letters Patent is:

1. A mark decoding system for interpreting prescribed vertical di-bit mark images as they are advanced across a portion of a prescribed image zone; said system comprising a rectilinear array of like sensor means arranged to bracket said zone; memory means arranged at the outputs of prescribed ones of said sensor means and adapted to store successive bit-indicating signals therefrom; output means arranged at the output of said memory means and adapted to transmit character-denoting signals therefrom to utilization means; bit pattern monitoring means arranged at the output of prescribed ones of said sensor means and adapted to control the transfer of character-indicating signals from said memory means to said output means in accordance with prescribed sequences of bit patterns; and sequencing means arranged to sequence the operations of said memory means.

2. The combination as recited in claim 1 wherein said monitoring means is adapted to selectively complement the output from said memory means according to detection of a prescribed directional shift in said signal patterns.

3. The combination as recited in claim 1 wherein said memory means includes a plurality of multi-bit storage means, each being connected to prescribe different ones of said sensor means, and wherein said monitoring means is adapted to selectively gate the output from one of said storage means exclusively according to detection of the center-line position of said images from other prescribed ones of said sensor means.

4. The combination as recited in claim 3 wherein said monitoring means additionally comprises a plurality of pairs of registration-decoder means, one pair being associated with each of said storage means, one decoder means in said pair being adapted to gate out the contents thereof to said output means in accordance with detection of a true character-code image and the other in accordance with the complementary image thereof, respectively, of said character patterns detected adjacent the sensor associated with the respective storage means.

5. A decoding system arranged to decode groups of character-indicating vertical di-bit indicia, the images thereof being advanced across one of several paths through a prescribed longitudinal zone, said system comprising:
an array of sensor means arranged to span said zone; a plurality of character-bit storage means, each said storage means being arranged to store bit signals reflecting the output of a prescribed different "reading" one of said sensor means, also being adapted to sequentially store a "character-comprising" number of said signals; ouput means adapted to receive character-indicating signals from said storage means and to responsively apply decoded character-representing signals to utilization means; and a plurality of decoding-gating means, each of said gating means being connected to sensor means adjacent a respective one of said "reading" sensor means and adapted to selectively apply said character-indicating signals to said output means from the associated one of said storage means according to prescribed registration indicating signals from said associated sensor means.

6. The combination as recited in claim 5 wherein each said decoding gating means comprises a true decoder means and a false decoder means; each said decoder means comprising input gate means and bistable signal generating means controlled by said gate means and adapted to apply gating signals to said output means reflecting the incidence of said prescribed registration indicating signals at said gate means; each of said gate means being connected to a pair of sensors adjacent the associated one of said reading sensor means so a to detect the occurrence of di-bit center-lines adjacent thereto.

7. The combination as recited in claim 6 wherein said storage means comprise four storage registers, a like portion of each register being connected to different like portions of said output means; and wherein said sensor means includes a plurality of photo detector means, at least one "reading" one thereof being connected to each of said registers and prescribed pairs thereof being connected to each of said decoder means, each of said pairs for each said true decoder means bracketing an image zone adajcent and above that of the reading photo detector means associated therewith; and each of said pairs for each said false decoder means bracketing an image zone adjacent and below that of the reading photo detector means associated therewith.

8. The combination as recited in claim 7 wherein is also included complement checking means adapted to monitor the validity of said di-bit indicia.

9. The combination as recited in claim 7 wherein is also included no transition detect means arranged to monitor successive output bit patterns from said reading sensor means and responsively flag the absence of one of said di-bit indicia within a character sequence.

10. The combination as recited in claim 7 wherein is also included horizontal noise check means arranged to indicate non-adjacency of intercharacter ones of said indicia.

11. The combination as recited in claim 7 wherein are also included: complement checking means adapted to monitor the validity of said bi-bit indicia no transition detect means arranged to monitor successive output bit patterns from said reading sensor means and responsively flag the absence of one of said di-bit indicia within a character sequence; horizontal noise check means arranged to indicate non-adjacency of inter-character ones of said indicia; and conflicting bit check means and also wherein the number of storage locations in each said register is equal to the number of bits in each character and wherein the number of said output means is likewise equal to the number of bits per character.

12. Apparatus for automatically interpreting intelligence comprising successive vertical di-bit marks, each mark comprising a pair of prescribed like translucence characteristics arranged on moving unit records to be decoded and applied to utilization means as said records are advanced in a prescribed manner past a sensing locus, said records including a panel forming the encoded portion thereof and having said marks arranged along a prescribed code axis therealong being either above or below said axis in complementary fashion and being detectably different from the background characteristics of said panel, the combination therewith comprising:
sensing means arranged to detect said code marks sequentially as they are advanced across any segment of said locus, said sensing means including a first plurality of first photo-sensor means and an associated plurality of storage means, one of said storage means being arranged at the output of each of said first sensor means; a second plurality of second photo-sensor means, at least one of said second photo-sensor means being disposed adjacent each one of said first photo-sensor means; output means arranged to apply character-representing signals to said utilization means; and decoder means connected to the outputs of adjacent ones of said first and second photo-sensor means and adapted to selectively apply character-indicating signals representing the contents of said associated first storage means to said output means, according to whether successive opposite di-bit signals are applied thereto; each of said storage means including a plurality of storage locations adapted to receive a prescribed number of said di-bit output signals and store them in sequence.

13. In a system for reading data marks on unit records as said marks are scanned successively past a read segment along one of prescribed adjacent paths across said segment, said marks being arranged on a prescribed portion of said records for indicating data in photo-detectable binary code, the combination therewith comprising:
a plurality of photoelectric sensing means disposed relative said segment so as to detect said marks moving along any one of said paths and adapted to generate binary coded bit signals representing the position of a prescribed binary portion of said code; output means for reading out said storage means; binary storage means arranged to responsively store said bit signals from said sensing means; gating means arranged at the output of certain of said sensing means adapted to selectively apply and selectively modify character-denoting signals from said storage means to said output means according to the registration position of said marks; and means for resetting said storage means at prescribed times between groups of said markings; said gating means being adapted to selectively modify said character-denoting signals only when said associated sensing means indicates centering of said patterns adjacent thereto.

14. A code reading system for scanning a prescribed segment across any portion of which images of bar-encoded document portions may be advanced sequentially, said images comprising code marks above or below a prescribed centerline, said system comprising:

a plurality of like detecting transducer means for scanning said marks successively and producing a member of bit-indicating signals; storage means coupled to the output of said transducer means for temporarily storing a prescribed number of said signals therefrom; position-monitoring means arranged at the output of prescribed ones of said transducer means and adapted to selectively modify the output from said storage means in a complemented or uncomplemented state according to the detected position of said marks relative said centerline; and timing means coupled to the output of said transducer means and arranged to reset said storage means and to read out said storage means in response to detection of prescribed patterns of said code marks.

15. A decoding system for decoding prescribed vertical di-bit mark patterns arranged along one of a number of prescribed adjacent code tracks intercepting a prescribed reading segment, said marks having a prescribed centerline portion, said system comprising:

a plurality of sensor means disposed to scan adjacent mark-image paths along said segment and arranged to emit character-indicating bit signals indicating presence of said marks there; a plurality of memory means arranged at the output of said sensor means and adapted to store said signals therefrom; output means adapted to receive character-decoded signals representing said bit-signals from said mark patterns; and output gating means adapted to detect the position of said patterns as transduced by said sensor means and accordingly controllably apply said character-indicating signals from a prescribed one of said memory means to said output means, and to selectively complement signal-representing manifestations thereof according to the binary state thereof as detected by said sensor means.

16. The combination as recited in claim 15 wherein is also included complement checking means connected to the output of said sensor means and adapted to indicate whether certain of the character-indicating signals therefrom are complementary with prescribed other signals therefrom.

References Cited

UNITED STATES PATENTS

| | | | |
|---|---|---|---|
| 3,104,369 | 9/1963 | Rabinow et al. | 340—146.3 |
| 3,140,466 | 7/1964 | Greanias et al. | 340—146.3 |
| 3,322,935 | 5/1967 | Wyke et al. | 235—61.11(5) |
| 3,310,658 | 3/1967 | Ryer | 235—61.11 |

DARYL W. COOK, *Primary Examiner.*

UNITED STATES PATENT OFFICE
CERTIFICATE OF CORRECTION

Patent No. 3,445,635                          May 20, 1969

Terrance Trickett et al.

It is certified that error appears in the above identified patent and that said Letters Patent are hereby corrected as shown below:

Column 11, line 50, "so a to detect" should read -- so as to detect --. Column 13, line 5, "producing a member" should read -- producing a number --.

Signed and sealed this 21st day of April 1970.

(SEAL)

Attest:

Edward M. Fletcher, Jr.                       WILLIAM E. SCHUYLER, JR.

Attesting Officer                                        Commissioner of Patents

Disclaimer 3,445,635.—*Terrance Trickett*, Bedford, *Donald J. Zepp*, Wellesley, *Benjamin Horne*, Needham, and *Thomas Brill*, Cochituate, Mass. DECODING ARRANGEMENT. Patent dated May 20, 1969. Disclaimer filed May 20, 1970, by the assignee, *Honeywell Inc.*

Hereby enters this disclaimer to claims 1, 2, 13 and 14 of said patent.

[*Official Gazette December 1, 1970.*]